United States Patent
Itoh et al.

(10) Patent No.: US 9,962,892 B2
(45) Date of Patent: May 8, 2018

(54) PNEUMATIC TIRE AND PROCESS FOR PRODUCING THE SAME

(75) Inventors: Takanori Itoh, Kanagawa (JP);
Takumi Hatakeyama, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 590 days.

(21) Appl. No.: 12/867,278

(22) PCT Filed: Feb. 24, 2009

(86) PCT No.: PCT/JP2009/053271
§ 371 (c)(1),
(2), (4) Date: Aug. 12, 2010

(87) PCT Pub. No.: WO2009/110353
PCT Pub. Date: Sep. 11, 2009

(65) Prior Publication Data
US 2011/0061783 A1    Mar. 17, 2011

(30) Foreign Application Priority Data
Mar. 7, 2008 (JP) ................................ 2008-058779

(51) Int. Cl.
*B60C 5/00* (2006.01)
*B29D 30/08* (2006.01)
(Continued)

(52) U.S. Cl.
CPC ................ B29D 30/42 (2013.01); B60C 5/14 (2013.01); *B60C 2005/145* (2013.01); *B60C 2005/147* (2013.01)

(58) Field of Classification Search
CPC ........ B29D 2030/422; B29D 2030/423; B29D 2030/427; B29D 2030/421;
(Continued)

(56) References Cited

U.S. PATENT DOCUMENTS 3,895,990 A * 7/1975 Josteit ........................ 156/304.3
4,226,654 A * 10/1980 Young ............................ 156/123
(Continued)

FOREIGN PATENT DOCUMENTS

AU    8436227 A * 6/1985
JP    02106331 A * 4/1990 ............. B29D 30/42
(Continued)

OTHER PUBLICATIONS

Machine Translation: JP05-221204; Sugiyama; No date.*
Summary: JP05-221204; Sugiyama; No date.*
Summary: JP04-182119; Nagumo; No date.*

*Primary Examiner* — Michael H. Wilson
*Assistant Examiner* — Kendra Ly
(74) *Attorney, Agent, or Firm* — Carrier Blackman & Associates, P.C.; Joseph P. Carrier; William D. Blackman

(57) ABSTRACT

Provided is a pneumatic tire improved in the durability at a splice part (2) of a tire-constituting member (1) and in the uniformity of the tire, and a process for producing the same. The pneumatic tire includes a tire-constituting member (1) having a splice part (2) on which a thin film (3) made of a thermoplastic resin or a thermoplastic elastomer composition is coated and fusion-bonded. In addition, the process for producing the pneumatic tire includes a step of heating the thin films (3) each arranged at the splice part (2) of an inner liner layer (14) or the splice part (2) of a carcass layer (13) so as to thermally fusing the thermoplastic resin or the thermoplastic elastomer composition constituting the thin films (3).

7 Claims, 3 Drawing Sheets

(51) Int. Cl.
*B29D 30/42* (2006.01)
*B60C 5/14* (2006.01)

(58) Field of Classification Search
CPC .............. B29C 66/1142; B29C 66/1224; B60C 2005/147; B60C 2005/145
USPC ......... 152/510, 451, 548; 156/157, 134, 122
See application file for complete search history.

(56) References Cited

U.S. PATENT DOCUMENTS

| | | | | |
|---|---|---|---|---|
| 4,227,956 A | * | 10/1980 | Honda et al. | 156/334 |
| 4,279,284 A | * | 7/1981 | Spadone | 152/511 |
| 4,810,317 A | * | 3/1989 | Lang | 156/134 |
| 4,946,525 A | * | 8/1990 | Aupic et al. | 156/134 |
| 5,010,142 A | * | 4/1991 | Takano | 525/332.4 |
| 5,062,462 A | * | 11/1991 | Rye et al. | 152/548 |
| 5,437,751 A | * | 8/1995 | Hirano et al. | 156/134 |
| 5,824,383 A | * | 10/1998 | Tuttle et al. | 428/60 |
| 6,533,891 B1 | * | 3/2003 | Kubinski | 156/304.3 |
| 2004/0092665 A1 | * | 5/2004 | Pazur et al. | 525/191 |
| 2006/0199917 A1 | * | 9/2006 | Chino | 525/374 |

FOREIGN PATENT DOCUMENTS

| | | | | | |
|---|---|---|---|---|---|
| JP | 02253932 A | * | 10/1990 | | B29D 30/30 |
| JP | 04067941 A | * | 3/1992 | | B29D 30/52 |
| JP | 04173238 A | * | 6/1992 | | B60C 9/04 |
| JP | 04182119 A | * | 6/1992 | | B29D 30/30 |
| JP | 05220866 A | * | 8/1993 | | B29D 30/30 |
| JP | 05221204 A | * | 8/1993 | | B60C 9/04 |
| JP | 6-040207 A | | 2/1994 | | |
| JP | 06080001 A | * | 3/1994 | | B60C 9/20 |
| JP | 9-164805 A | | 6/1997 | | |
| JP | 2000-198314 A | | 7/2000 | | |
| JP | 2001-322403 A | | 11/2001 | | |
| JP | 2007-009121 A | | 1/2007 | | |
| JP | 2007009121 A | * | 1/2007 | | B60C 5/14 |

* cited by examiner

PNEUMATIC TIRE AND PROCESS FOR PRODUCING THE SAME

TECHNICAL FIELD

The present invention relates to a pneumatic tire and a process for producing the same. More specifically, the present invention relates to a pneumatic tire whose durability is improved at a splice part of a tire-constituting member, and a process for producing the same.

BACKGROUND ART

In general, many of the tire-constituting members have a sheet-like shape, and end portions of such sheets are spliced to each other to assemble the tire-constituting members. Joining methods for a splice part include: an overlap method of overlapping end portions of a tire-constituting member one above the other; and a butt method of butting two end portions of a tire-constituting member.

Out of these tire-constituting members, an inner liner layer and a carcass layer are each arranged in a tire circumferential direction on a tire-forming drum, and are each formed by splicing their two end portions in the tire circumferential direction to each other. Therefore, the splice part of this formed body is subjected to a large shearing force in the tire circumferential direction during a lifting step in a tire forming process for expanding the diameter of the formed body, and during a lifting step in a curing process for expanding the diameter of an uncured tire in a curing mold. With this taken into consideration, the overlap method of overlapping end portions 1a of a tire-constituting member 1 one above the other as shown in FIG. 6 is used for the splice part of each of the inner layer and the carcass layer. A width x of the overlap between these end portions 1a is set large enough to fully absorb the amount of shift occurring between the end portions 1a due to a shearing force.

If this overlap width x is small in a heavy-duty pneumatic tire needing to keep its filled air pressure high and receiving a large load at its shoulder part, a splice part 2 of a carcass member in the shoulder part opens up, and an inner liner rubber and a tie rubber, which are arranged on an inner periphery of the carcass layer, go into the splice part 2. This causes what is termed as blowout failure, which later leads to fracture of the tread rubber.

If, however, the width x of the overlap between the two end portions 1a is made too large for the purpose of securing bonding strength of the splice part 2, the rigidity of the splice part 2 becomes locally large. As a result, vibrations of a tire while it is rotating are amplified, and accordingly the heterogeneity (uniformity) of the tire is deteriorated. For this reason, it has been an important issue that how large the width x of the overlap between the two end portions 1a should be set in order to achieve both the durability and the uniformity.

For the purpose of solving this problem, a proposal has been made in which: an ear rubber whose thickness is almost half of the thickness of a tire-constituting member, such as a carcass layer, is beforehand formed in each of end portions thereof in such a way as to project from the end portion; and the end portions are spliced to each other by overlapping one above the other (refer to Patent Document 1, for instance). However, this proposed method needs a step of forming the ear rubber in each of the end edges, and accordingly reduces its productivity. In addition, ear rubbers are likely to cause buckling during the splicing work because of their thinness; therefore, there is a problem that air gets into the splice part and accordingly the durability is decreased.

Patent Document 1: Japanese patent application Kokai publication No. 2001-322403

DISCLOSURE OF THE INVENTION

Means for Solving the Problem

An object of the present invention is to solve the above-described problems, and thus to provide a pneumatic tire whose durability is improved in a splice part of a tire-constituting member, and a process for producing the same. Another object of the present invention is to provide a pneumatic tire whose durability is improved at a splice part of a tire-constituting member while enhancing the tire uniformity, and a process for producing the same.

An pneumatic tire according to the present invention for achieving the above-described objects is a pneumatic tire having a configuration in which a sheet-shaped tire-constituting member is arranged in a tire circumferential direction while having end portions in the tire circumferential direction spliced to each other, the pneumatic tire characterized in that a splice part of the tire-constituting member is coated and fusion-bonded with a thin film made of any one of a thermoplastic resin and a thermoplastic elastomer composition.

Furthermore, regarding the above-described configuration, it is preferable to configure as described in (1) to (5) below.

(1) It is configured that the splice part is formed in a butt configuration in which the end portions are butted to each other, and the thin film extends on both surfaces of the respective end portions.

(2) It is configured that the splice part is formed in a butt configuration in which the end portions are butted to each other, and the thin film is interposed between the end portions.

(3) It is configured that an adhesive layer is arranged on a surface of the thin film, and the adhesive layer is arranged to face the tire-constituting member.

(4) It is configured that, in the tire after curing, a thickness of the thin film is 10 to 1500 μm, and a total coating width of the thin film at the splice part is 20 to 150 mm in the tire circumferential direction.

(5) It is configured that the tire-constituting member is any one of an inner liner layer and a carcass layer. In this case, it is preferable to configure that the inner liner layer is made of a butyl-based rubber composition.

Meanwhile, a process for producing a pneumatic tire according to the present invention is characterized by comprising: arranging an inner liner layer on a tire-forming drum, and coating a splice part of the inner liner layer with a thin film made of any one of a thermoplastic resin and a thermoplastic elastomer composition; subsequently, winding a carcass layer around an outer periphery of the inner liner layer, and butting and bonding portions of a splice part of the carcass layer to each other with a thin film interposed in between, the thin film being made of any one of the thermoplastic resin and the thermoplastic elastomer composition; and, thereafter, thermally fusing the thin films by heating the splice part of the inner liner layer and the splice part of the carcass layer.

Effects of the Invention

In the pneumatic tire according to the present invention, the thin film made of a thermoplastic resin or a thermoplastic elastomer composition is coated and fusion-bonded to the splice part of the tire-constituting member. Accordingly, the bonding strength of the splice part is increased by the coating of this thin film. Therefore, it is possible to prevent the formation of an opening at the splice part during the lifting step both in the tire forming process and in the tire curing process. In addition, the thermoplastic resin or the thermoplastic elastomer composition constituting the thin film flows into an interstice in the splice part and fills the interstice during the fusion bonding. Therefore, the bonding strength of the splice part is further enhanced in the tire after curing. Thus, it is possible to improve the durability of the tire.

Furthermore, since the bonding strength of the splice part is improved as described above, it is possible to configure the splice part in the butt configuration. Even in the case where the splice part is configured in the overlap configuration, the overlap width can be reduced as much as possible. Therefore, it is possible to improve the uniformity of the tire.

Moreover, according to the process for producing the pneumatic tire according to the present invention, the inner liner layer whose splice part is coated with the thin film made of the thermoplastic resin or the thermoplastic elastomer composition is arranged on the tire-forming drum; the carcass layer whose end portions are butted and bonded to each other with the thin film made of the thermoplastic resin or the thermoplastic elastomer composition being interposed in between is arranged on the outer periphery of the inner liner layer; and the thin films are thermally fused by heating the splice part of the inner liner layer and the splice part of the carcass layer. Accordingly, prior to the lifting step in the tire forming process, the strength of the splice part of each of the inner liner layer and the carcass layer can be further increased by the thermal fusion of the thermoplastic resin or the thermoplastic elastomer composition. Therefore, even in the case of a tire whose lifting rate in the tire forming process is higher, it is possible to securely prevent the formation of opening at the splice parts during the lifting step.

Figure 1:
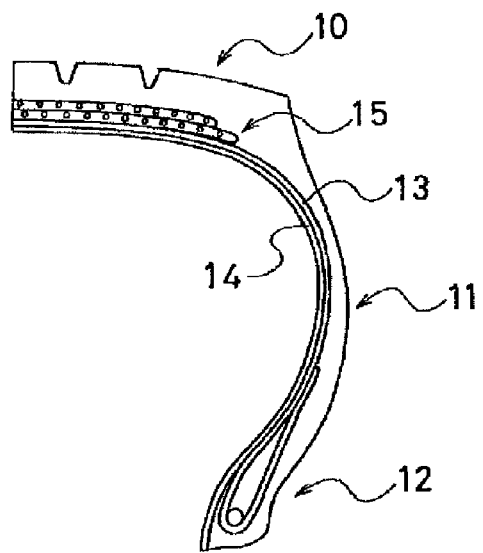
FIG. 1 is a half cross-sectional view showing an example of a pneumatic tire according to an embodiment of the present invention.

EXPLANATION OF REFERENCE NUMERALS 1 tire-constituting member
2 splice part
3 thin film
4 adhesive layer
13 carcass layer
14 inner liner layer

BEST MODES FOR CARRYING OUT THE INVENTION

Hereinbelow, detailed descriptions will be provided for a configuration of the present invention by referring to the attached drawings.

FIG. 1 is a half cross-sectional view showing a tire after curing with regard to an example of a pneumatic tire according to an embodiment of the present invention.

In FIG. 1, 10 denotes a tread part; 11 denotes a sidewall part; and 12 denotes a bead part. In an inner side of the tire, a carcass layer 13 extends from the tread part 10 to the bead parts 12 by passing through the left and right side wall parts 11. This carcass layer 13 is arranged in such a way that two end portions thereof are folded back at the respective bead parts 12. An inner liner layer 14 is provided in an inner side of this carcass layer 13 as an air-permeation preventive layer. In addition, two belt layers 15 are provided in an outer peripheral side of the carcass layer 13.

Out of the above-mentioned tire-constituting members, the carcass layer 13 is configured by coating multiple carcass cords, which are aligned in a direction substantially orthogonal to a tire circumferential direction, with a coat rubber. The inner liner layer 14 is constituted of a rubber sheet made of a butyl-based rubber composition. Each of these tire-constituting members is configured by arranging one or more sheet-shaped materials aligned along the tire circumferential direction, and splicing the end portions thereof in the tire circumferential direction to each other. Then, as described later, it is configured that the splice part is coated with a thin film made of a thermoplastic resin or a thermoplastic elastomer composition and is fusion-bonded together.

Figure 2:
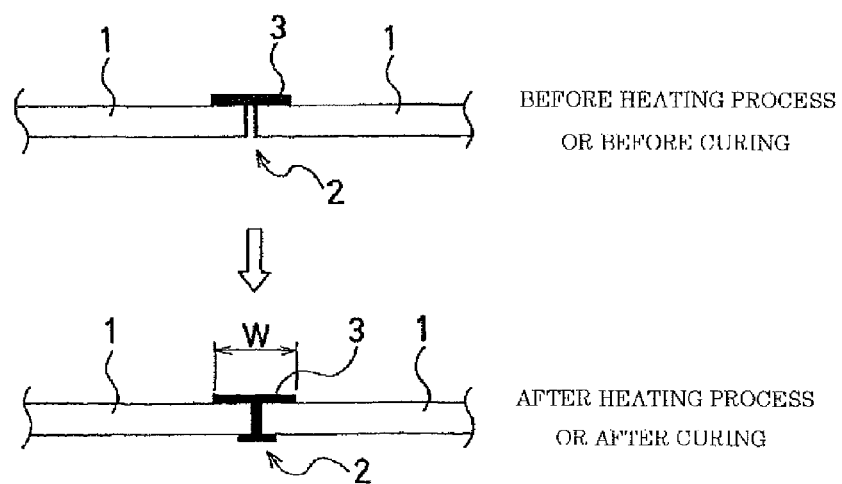
FIG. 2 is partial cross-sectional views for explaining a structure of a splice part before being subjected to a heating process or a curing process and a structure of the splice part after being subjected to the heating process or the curing process, respectively, with regard to a tire-constituting member according to the embodiment of the present invention.

FIG. 2 shows a structure of a splice part of a tire-constituting member according to the embodiment of the present invention. The upper illustration of FIG. 2 shows to the status before a heating process or a curing process. The lower illustration of FIG. 2 shows the status after the heating process or the curing process. In other words, in the case of the pneumatic tire according to the present invention, as shown in the upper illustration of FIG. 2, the splice part 2 of the tire-constituting member 1, 1 is coated with a thin film 3 made of the thermoplastic resin or the thermoplastic elastomer composition. Then, as shown in the lower illustration of FIG. 2, this thin film 3 is fused through a heating process or a curing process. The thermoplastic resin or the thermoplastic elastomer composition obtained by fusing the thin film 3 flows into the interstice in the splice part 2, and fills this interstice. Thereby, the end portions of the tire-constituting member 1, 1 are thermally fusion-bonded together.

Figure 4A:
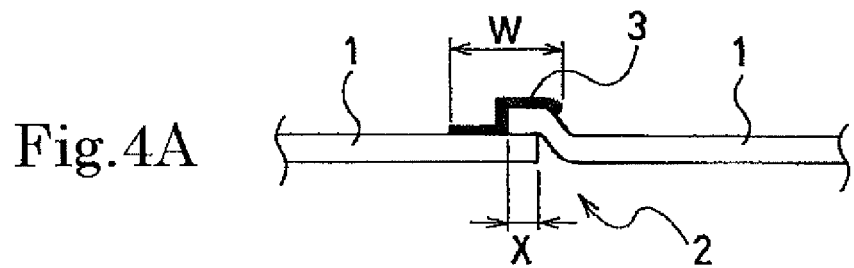
FIGS. 4A and 4B are partial cross-sectional views corresponding to FIG. 3 with regard to other embodiments of the present invention, respectively.

Note that, in the embodiment in the upper illustration of FIG. 2, description is provided for the case where the joining configuration of the splice part 2 of the tire-constituting member 1 is a butt configuration in which the end portions of the tire-constituting member 1, 1 are butted to each other. Nevertheless, in the case of the pneumatic tire according to the present invention, the joining configuration of the splice part 2 may be an overlap configuration as shown in FIG. 4A in some cases.

As described later, the pneumatic tire according to the present invention is configured in such a way that the bonding strength of the splice part 2 of the tire-constituting member 1 is increased by coating the splice part 2 with the thin film 3 on the tire-forming drum; and thereby the formation of opening at the splice part 2 is prevented during a lifting step in a tire forming process. To this end, it is desirable that: prior to this lifting step, the thermoplastic resin or the thermoplastic elastomer composition be fused by heating the splice part 2 on the tire-forming drum so that the end portions of the tire-constituting member can be fusion-bonded to each other. By doing so, it is possible to securely prevent the formation of opening at the splice part 2 during the lifting step in the tire forming process even in the case of a tire with a higher lifting rate.

Furthermore, the boding strength of the splice part 2 is improved as described above. Accordingly, it is possible to employ the butt configuration for the splice part 2. Moreover, even in the case where the overlap configuration is employed for the splice part 2, the overlap width x can be made as smaller as possible. Thus, the uniformity of the tire can be improved.

Figure 3A:
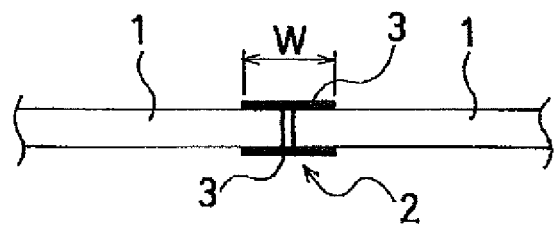
FIGS. 3A to 3E are partial cross-sectional views for explaining a structure of the splice part before being subjected to a heating process or a curing process, with regard to tire-constituting members according to other embodiments of the present invention, respectively.
Figure 3B:
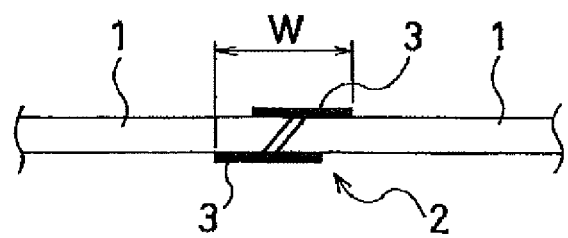
Figure 4B:
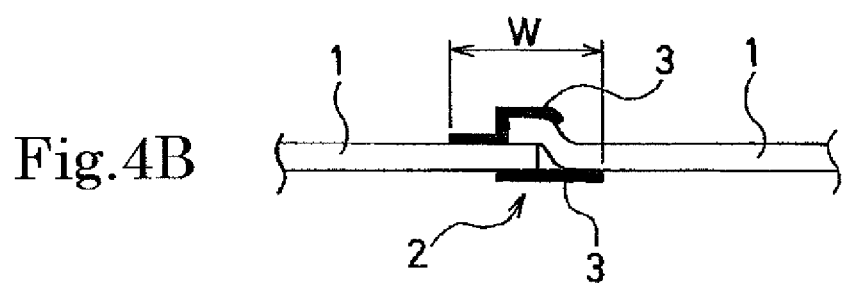

In the present invention, no specific restriction is imposed on the coating configuration of the thin film 3 at the splice part 2. As described above, the coating may be applied in such a way as to extend on both of the top surfaces of the respective two end portions of the tire-constituting parts 1, as shown in the upper illustration of FIG. 2 and in FIG. 4A, or the coating may be applied in such a way as to extend on both of the surfaces of the respective two end portions of the tire-constituting parts 1, as shown in FIG. 3A and FIG. 4B. Moreover, as exemplified in FIG. 3B, it may be configured that the end portions of the tire-constituting member 1 are each formed into a tapered surface and the tapered surfaces of the respective end portions are arranged to face each other.

Figure 3C:
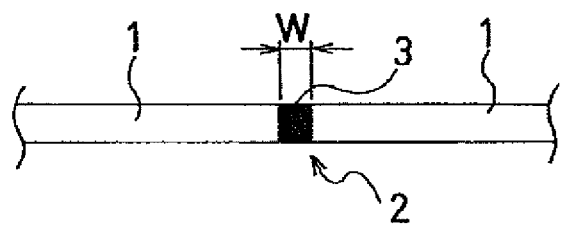
Figure 3D:
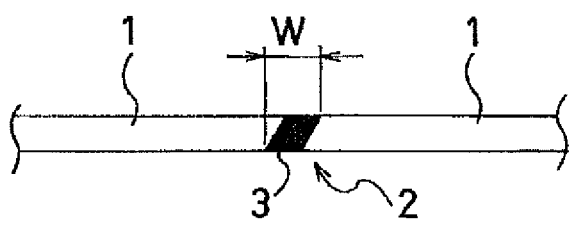
Figure 3E:
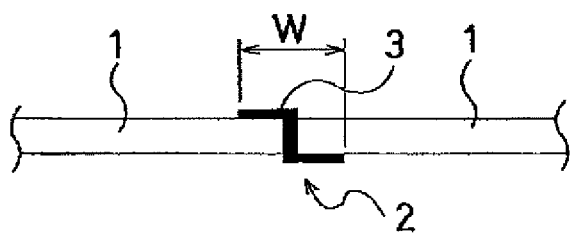

Furthermore, it may be configured that, on adopting the butt configuration to form the splice part 2 by butting the end portions of the tire-constituting member 1 to each other, the thin film 3 is interposed between the end portions, as shown in FIGS. 3C to 3E. Thereby, it is possible to further increase the bonding strength at the splice part 2.

Examples of the thermoplastic resin which can be preferably used to make the thin film 3 include: polyamide-based resins [for instance, nylon 6 (N6), nylon 66 (N66), nylon 46 (N46), nylon 11 (N11), nylon 12 (N12), nylon 610 (N610), nylon (N612), a nylon 6/66 copolymer (N6/66), a nylon 6/66/610 copolymer (N6/66/610), nylon MXD6 (MXD6), nylon 6T, a nylon 6/6T copolymer, a nylon 66/PP copolymer, and a nylon 66/PPS copolymer] and their N-alkoxyalkylates, such as a methoxymethylate of nylon 6, a methoxymethylate of a nylon 6/610 copolymer, and a methoxymethylate of nylon 612; polyester-based resins [for instance, aromatic polyesters, such as polybutylene terephthalate (PBT), polyethylene terephthalate (PET), polyethylene isophthalate (PEI), a PET/PEI copolymer, polyarylate (PAR), polybutylene naphthalate (PBN), liquid-crystal polyester, and a polyoxyalkylene diimidic acid/polybutylene terephthalate copolymer]; polynitrile-based resins [for instance, polyacrylonitrile (PAN), polymethacrylonitrile, an acrylonitrile/styrene copolymer (AS), a (meth) acrylonitrile/styrene copolymer, and a (meth)acrylonitrile/styrene/butadiene copolymer]; polymethacrylate-based resins [for instance, polymethylmethacrylate (PMMA), and polyethylmethacrylate]; polyvinyl-based resins [for instance, vinyl acetate, polyvinyl alcohol (PVA), a vinyl alcohol/ethylene copolymer (EVOH), polyvinylidene chloride (PDVC), polyvinyl chloride (PVC), a vinyl chloride/vinylidene chloride copolymer, a vinylidene chloride/methyl acrylate copolymer, and a vinylidene chloride/acrylonitrile copolymer (ETFE)]; cellulose-based resins [for instance, cellulose acetate, and cellulose acetate butyrate]; fluororesins [for instance, polyvinylidene fluoride (PVDF), polyvinyl fluoride (PVF), polychlorofluoroethylene (PCTFE), and a tetrafluoroethylene/ethylene copolymer (ETFE)]; and imide-based resins [for instance, aromatic polyimide (PI)].

In addition, the thermoplastic elastomer composition used in the present invention can be made by blending the above-mentioned thermoplastic resin with the elastomer.

Examples of the elastomer which can be preferably used to make the thermoplastic elastomer composition include: diene-based rubbers and their hydrogenated products [for instance, natural rubber (NR), isoprene rubber (IR), epoxidized natural rubber, styrene butadiene rubber (SBR), butadiene rubbers (BR, high cis BR and low cis BR), nitrile rubber (NBR), hydrogenated NBR and hydrogenated SBR]; olefin-based rubbers [for instance, ethylene propylene rubbers (EPDM, EPM), maleic acid-modified ethylene propylene rubber (M-EPM), butyl rubber (IIR), a copolymer of an isobutylene monomer and an aromatic vinyl monomer or a diene monomer, acrylic rubber (ACM), and an ionomer]; halogen-containing rubbers [for instance, Br-IIR, Cl-IIR, a bromized isobutylene para-methyl styrene copolymer (Br-IPMS), chloroprene rubber (CR), hydrin rubber (CHR), chlorosulfonated polyethylene rubber (CSM), chlorinated polyethylene rubber (CM), and maleic acid-modified chlorinated polyethylene rubber (M-CM)]; silicone rubbers [for instance, methyl vinyl silicone rubber, dimethyl silicone rubber, and methyl phenyl vinyl silicone rubber]; sulfur-containing rubbers (for instance, polysulfide rubber); fluororubbers [for instance, a vinylidene fluoride-based rubber, a fluorine-containing vinyl ether-based rubber, a tetrafluoroethylene-propylene-based rubber, a fluorine-containing silicon-based rubber, and a fluorine-containing phosphagen-based rubber]; and thermoplastic elastomers [for instance, a styrene-based elastomer, an olefin-based elastomer, an ester-based elastomer, an urethane-based elastomer, and a polyamide-based elastomer].

In the case where the compatibility of a specific thermoplastic resin mentioned above is different that of a specific elastomer mentioned above, an appropriate compatibilizing agent may be adapted as a third component in order to achieve the compatibility between these two. The mixture of a compatibilizing agent into the blend system reduces the interfacial tension between the thermoplastic resin and the elastomer, and thus makes rubber particles which form the dispersion layer smaller in diameter. Accordingly, the characteristics of the respective two components are to be more effectively exhibited. Such a compatibilizing agent may be a copolymer of both or one of the structure of the thermoplastic resin and the structure of the elastomer, or may be any ones having a structure of a copolymer containing any one of an epoxy group, a carbonyl group, a halogen group, an amino group, an oxazoline group, a hydroxyl group, and the like, which can react with the thermoplastic resin or the elastomer. The compatibilizing agent may be selected depending on the type of the thermoplastic resin and the elastomer into which the compatibilizing agent is blended. Examples of the compatibilizing agent which is commonly used includes: a styrene/ethylene-butylene block copolymer (SEBS) and its maleic acid-modified product; EPDM; EPM; a copolymer of EPDM/styrene or EPDM/acrylonitrile graft and its maleic acid-modified product; a styrene/maleic acid copolymer; reactive phenoxine, and the like. No specific restriction is imposed on the blending proportion of such a compatibilizing agent. However, it is desirable that the blending proportion of the compatibilizing agent should be 0.5 to 10 parts by weight relative to 100 parts by weights of the polymer components (the total amount of the thermoplastic resin and the elastomer).

No specific restriction is imposed on the component ratio between a specific thermoplastic resin and a specific elastomer in the thermoplastic elastomer composition. The component ratio may be determined appropriately in order that the thermoplastic elastomer can have a structure in which the elastomer is dispersed as a discontinuous phase in a matrix of the thermoplastic resin. A desirable range of this component ratio is 90/10 to 30/70 in weight ratio.

In the case of the prevent invention, a different polymer, such as the above-mentioned compatibilizing agent, may be mixed with the thermoplastic resin and the thermoplastic elastomer composition constituting the thin film 3 within a range which does not allow the thus-mixed polymers to harm the characteristics required for the thin film 3. The purposes of mixing a different polymer include: improving the compatibility between the thermoplastic resin and the elastomer; improving the forming processability of the material; improving the heat resistance; reducing the costs; and the like. Examples of the materials which can be used for this include polyethylene (PE), polypropylene (PP), polystyrene (PS), ABS, SBS, polycarbonate (PC), and the like. In addition, it is also possible to add a filler (calcium carbonate, titanium oxide, alumina and the like) generally blended with a polymer blend, a reinforcing agent, such as carbon black and white carbon, a softener, a plasticizer, a processing aid, a pigment, a dye, and an antioxidant, as necessary within a range of not harming the characteristics required for the thin film 3.

Figure 5A:
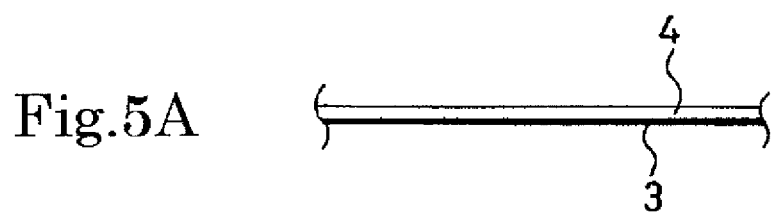
FIGS. 5A and 5B are partial cross-sectional views respectively showing lamination patterns between a thin film and an adhesive layer according to the embodiment of the present invention.

In the case of the present invention, for the purpose of strengthening the adhesion between the thin film 3 and the tire-constituting member 1, it is desirable that, as shown in FIG. 5A, an adhesive layer 4 be arranged on one surface of the thin film 3 in such a way as to face the tire-constituting member 1. The material for the adhesive layer 4 may be selected depending on the type of the tire-constituting member 1 whenever deemed necessary.

Figure 5B:
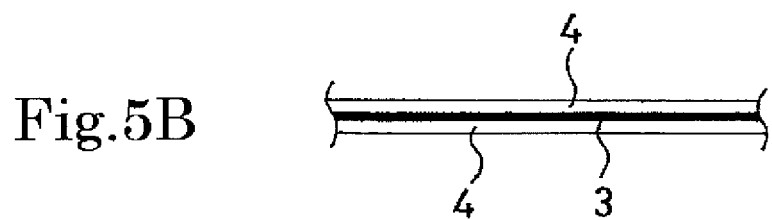

Furthermore, for the purpose of strengthening the adhesion between the thin film 3 and the surrounding rubber, the adhesive film 4 may be arranged on each of the two surfaces of the thin film 3 as shown in FIG. 5B. Thereby, the bonding strength at the splice part 2 can be further strengthened.

In the case of the pneumatic tire according to the present invention, it is desirable that the thickness of the thin film 3 in a tire after curing should be adjusted to be 10 to 1500 μm, and preferably 500 to 1000 μm. In addition, it is desirable that the total coating width w of the thin film 3 coating the splice part 2 (the maximum width of the coating over both the upper and lower surfaces) should be 20 to 150 mm, and preferably 30 to 60 mm. If the thickness of the thin film 3 falls short of 10 μm, the bonding strength at the splice part 2 is insufficient. If the thickness of the thin film 3 exceeds 1500 μm, it is impossible to sufficiently obtain the effect of enhancing the uniformity of the tire. Moreover, if the total coating width w of the thin film 3 falls short of 20 mm, the strength at the splice part 2 is insufficient similarly to the case described above. If the total coating width w of the thin film 3 exceeds 150 mm, it is impossible to sufficiently obtain the effect of enhancing the uniformity of the tire.

Furthermore, it is desirable that the present invention should be applied to the inner line layer 14 and the carcass layer 13 because they, out of the tire-constituting members 1, are subjected to the largest shearing force during the lifting step in the tire forming process. For this reason, in the case of the pneumatic tire according to the present invention, it is desirable that the splice parts 2 of at least the inner liner layer 14 and the carcass layer 13 should be coated with the thin film 3 made of the thermoplastic resin or the thermoplastic elastomer composition.

In addition, the present invention can be preferably applied to a pneumatic tire adapting a butyl-based rubber composition as the inner liner layer 14. The reason is the following: the adhesion of the butyl-based rubber composition is inferior to that of the generally-used diene-based rubber; the splice part 2 is likely to open up easily in the pneumatic tire adapting a butyl-based rubber as the inner liner layer 14; and the application of the present invention to the pneumatic tire prevents the formation of an opening at the splice part 2 in the inner liner layer 14; thus, the effect of improving the durability can be significantly exhibited.

Furthermore, the present invention can also be preferably applied to a pneumatic tire adopting a thermoplastic resin or a thermoplastic elastomer composition as the inner liner layer 14. The reason is the following: the thin film 3 made of the thermoplastic resin or the thermoplastic elastomer composition is arranged at the splice part 2 of the carcass layer 13 in the pneumatic tire of the present invention; therefore, when the material of the thin film 3 is provided by a material having the same nature as that of the thermoplastic resin or the thermoplastic elastomer composition constituting the inner liner layer 14, the splice part 2 of the carcass layer 13 and the inner liner layer 14 are fusion-bonded to each other, and thereby a stronger adhesion at the splice part 2 can be obtained.

Moreover, as described above, tire defects at the splice part 2 occur more conspicuously for a tire having a larger lifting ratio in the tire forming process and a tire having a higher pneumatic filling pressure. Therefore, when the present invention is applied to a heavy-duty pneumatic tire for trucks, buses and the like, an especially excellent effect can be exhibited.

A process for producing a pneumatic tire according to the present invention is characterized by comprising: arranging an inner liner layer on a tire-forming drum, and coating a splice part of the inner liner layer with a thin film made of any one of a thermoplastic resin and a thermoplastic elastomer composition; subsequently, winding a carcass layer around an outer periphery of the inner liner layer, and butting and bonding portions of a splice part of the carcass layer to each other with a thin film being interposed in between, the thin film being made of any one of the thermoplastic resin and the thermoplastic elastomer composition; and, thereafter, thermally fusing the thin films by heating the splice part of the inner liner layer and the splice part of the carcass layer.

Thereby, prior to the lifting step in the tire forming process, the strength of the splice 2 of each of the inner liner layer 14 and the carcass layer 13 can be further strengthened by thermal fusion-boding of the thermoplastic resin or the thermoplastic elastomer composition. Accordingly, even in the case of a tire having a high lifting rate, it is possible to prevent the formation of opening at the splice part 2 during the lifting step.

Thus, even in the cases where the distance between the butted portions of the splice part 2 of the carcass layer 13 is approximately 1 mm, and where the overlap width x at the splice part 2 of the carcass layer 13 is approximately 1 to 2 mm, it is possible to securely prevent the formation of opening at the splice part 2 during the lifting step in the tire forming process. In particular, in the case where the inner liner layer 14 is made of a thermoplastic resin or a thermoplastic elastomer composition, the splice part 2 of each of the inner liner layer 14 and the carcass layer 13 is more firmly united; thus, the durability can be further improved.

Examples

A conventional tire (Conventional Example) in which the thin film 3 is not arranged at the splice part 2 and tires according to the present invention (Examples 1 to 7) in which the thin film 3 is arranged at the splice part 2 were produced under the following conditions: the tire size is 275/80R22.5; a tire structure shown in FIG. 1 is employed; all the specifications except for the carcass layer 13 are made in common thereamong; and the structure of the splice part 2 of the carcass layer 13, the total coating width w of the thin film 3, the presence of an adhesive layer on a surface of the thin film 3, and application of thermal fusion of the thin film 3 in the tire forming process are varied as shown in Table 1. Note that a butyl rubber was used for the inner liner layer 14 included in each of the tires. A thermoplastic elastomer composition obtained by blending nylon 6/66 and Br-IPMS together was used for the thin film 3 included in the tires according to the present invention. The thickness of this thin film 3 was set to be 700 μm.

For each of these 8 types of tire, the state of opening formed at the splice part of the carcass layer (hereinafter referred to as formation of opening at the splice part), the uniformity and the durability were evaluated in accordance with the following experimental method. The evaluation results are shown in Table 1 as index data in comparison with that of Conventional Example set to 100. A larger index value indicates superiority.

[Evaluation of the Formation of Opening at the Splice Part]

Regarding each of the tires, the state of opening formed at the splice part of the carcass layer (the number and size of the openings) was visually observed. The results provided the evaluation of the formation of opening at the bonding part.

[Evaluation of the Uniformity]

For each of the tires, the uniformity (RFV) was measured in accordance with JASO C607 with the tire filled to an air pressure of 900 kPa while being mounted on a rim (rim size: 22.5×7.50). The results provided the evaluation of the uniformity.

[Evaluation of the Durability]

Each of the tires was filled to an air pressure of 900 kPa while being mounted on the rim (rim size: 22.5×7.50). By use of an indoor drum-testing machine (drum diameter: 1707 mm), each of the tires was subjected to running at a speed of 45 km/h with a load of 47.36 kN until blowout failure occurred at a shoulder part. The running distance provided the evaluation of the durability.

TABLE 1

Figure 6:
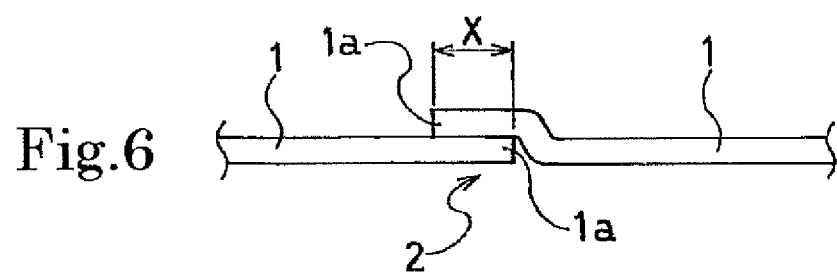
FIG. 6 is a partial cross-sectional view showing a structure of a splice part of a conventional tire-constituting member.

| | Conventional Example | Example 1 | Example 2 | Example 3 | Example 4 | Example 5 | Example 6 | Example 7 |
|---|---|---|---|---|---|---|---|---|
| Structure of splice part | FIG. 6 | FIG. 2 | FIG. 3A | FIG. 2 | FIG. 3A | FIG. 3D | FIG. 3D | FIG. 3E |
| Total coating width of thin layer (mm) | — | 30 | 30 | 30 | 30 | 60 | 60 | 60 |
| Adhesive layer on thin layer surface | — | No | No | Yes | Yes | No | Yes | Yes |
| Thermal fusion of thin layer at forming | — | No | No | No | No | No | No | Yes |
| Evaluation Formation of opening at splice part | 100 | 103 | 105 | 108 | 110 | 105 | 110 | 115 |
| Uniformity | 100 | 110 | 110 | 110 | 110 | 110 | 110 | 110 |
| Durability | 100 | 102 | 102 | 102 | 102 | 103 | 103 | 103 |

According to Table 1, it is clear that the formation of opening at the splice part is prevented while the uniformity and the durability are improved in the tires according to the present invention in comparison with the conventional tire.

What is claimed is:

1. A pneumatic tire having a configuration in which a sheet-shaped tire-constituting member is arranged in a tire circumferential direction while having end portions in the tire circumferential direction spliced to each other, wherein
    the tire-constituting member is formed of rubber,
    a splice part of the tire-constituting member is coated and fusion-bonded with a thin film consisting essentially of any one of a thermoplastic resin and a thermoplastic elastomer composition,
    the splice part is formed in a butt configuration in which the end portions are butted to each other, and the thin film is present on radially inner and outer surfaces of the respective end portions of the tire constituting member and extends on both surfaces of the respective end portions, and
    a total coating width of the thin film at the splice part is 30 to 60 mm in the tire circumferential direction.

2. The pneumatic tire according to claim 1, wherein the thin film is also interposed between the end portions.

3. The pneumatic tire according to claim 1, wherein an adhesive layer is arranged on a surface of the thin film, and
    the adhesive layer is arranged to face the tire-constituting member.

4. The pneumatic tire according to claim 1, wherein, in the tire after curing, a thickness of the thin film is 10 to 1500 μm.

5. The pneumatic tire according to claim 1, wherein the tire-constituting member is any one of an inner liner layer and a carcass layer.

6. The pneumatic tire according to claim 5, wherein the tire-constituting member is an inner liner layer made of a butyl-based rubber composition.

7. The pneumatic tire according to claim 1, wherein the sheet-shaped tire-constituting member is one of an inner liner layer and a carcass layer, and the other of the inner liner layer and the carcass layer also includes a splice part which is coated and fusion-bonded with a thin film made of any one of the thermoplastic resin and the thermoplastic elastomer composition, and which has a total coating width of 30 to 60 mm in the tire circumferential direction.

\* \* \* \* \*